US008293047B2

(12) United States Patent
Minganti

(10) Patent No.: US 8,293,047 B2
(45) Date of Patent: Oct. 23, 2012

(54) MACHINE AND A METHOD FOR LABELLING CONTAINERS

(75) Inventor: Gianni Minganti, Imola (IT)

(73) Assignee: Sacmi Cooperativa Meccanici Imola Societa' Cooperativa, Imola (Bologna) (IT)

( * ) Notice: Subject to any disclaimer, the term of this patent is extended or adjusted under 35 U.S.C. 154(b) by 408 days.

(21) Appl. No.: 12/666,066

(22) PCT Filed: Jun. 12, 2008

(86) PCT No.: PCT/EP2008/057422

§ 371 (c)(1),
(2), (4) Date: Dec. 22, 2009

(87) PCT Pub. No.: WO2009/000668

PCT Pub. Date: Dec. 31, 2008

(65) Prior Publication Data

US 2010/0181009 A1 Jul. 22, 2010

(30) Foreign Application Priority Data

Jun. 22, 2007 (IT) .............................. RE2007A0082

(51) Int. Cl.
*B32B 37/00* (2006.01)

(52) U.S. Cl. .............. 156/86; 156/84; 156/85; 156/497; 156/499; 156/556; 156/566

(58) Field of Classification Search .............. 156/84–86, 156/305, 497, 499, 556, 566
See application file for complete search history.

(56) References Cited

U.S. PATENT DOCUMENTS

| | | | | |
|---|---|---|---|---|
| 3,767,496 | A | 10/1973 | Karabedian et al. | |
| 4,199,851 | A | 4/1980 | Doherty | |
| 2006/0249257 | A1 | 11/2006 | Ghini | |
| 2006/0260733 | A1 * | 11/2006 | Minganti | ........................ 156/86 |

FOREIGN PATENT DOCUMENTS

| | | | |
|---|---|---|---|
| DE | 19716079 | A1 | 4/1998 |
| DE | 10066019 | A1 * | 7/2002 |
| EP | 1086900 | A1 | 3/2001 |
| WO | 2004067385 | A1 | 8/2004 |
| WO | 2004085263 | A1 | 10/2004 |
| WO | 2005082601 | A1 | 9/2005 |
| WO | WO-2005/082601 | A1 * | 9/2005 |

* cited by examiner

*Primary Examiner* — Jeff Aftergut
(74) *Attorney, Agent, or Firm* — Browdy and Neimark, PLLC

(57) ABSTRACT

A machine for labelling containers (100), comprising first transport means (2) for positioning at least a container (100) at a time in a labelling position, second transport means (3) for positioning an annular heat-shrinkable label (200) below the at least a container (100) in a labelling position, raising means (50, 52) for raising the label (200) for inserting the label from below onto a container (100) in a labelling position, and dispensing means (51, 53) for investing the label (200) with a hot fluid; the dispensing means (51, 53) being unconstrained to the second transport means (3) such as to be stationary with respect to the labels (200) which advance, activated by the second transport means (3), and are configured such as to perform heat-shrinkage of at least a portion of the label (200) inserted on the at least a container (100) in a labelling position thereon, in which the portion extends over an entire axial development of the label (200).

25 Claims, 11 Drawing Sheets

MACHINE AND A METHOD FOR LABELLING CONTAINERS

TECHNICAL FIELD

The invention relates to a machine and a method for labelling containers using heat-retractable labels in the form of annular bands.

In particular, the present invention relates to a machine and a method for labelling containers which generally comprise a containing cup having an upper mouth which is provided with a flat perimeter edge that projects externalwards of the tray, such as for example yoghurt cups.

BACKGROUND ART

In the prior art, the labelling of these containers is done by means of special labelling machines, which are usually located in line with machines for forming and subsequently filling and closing the containers, in a single production plant going by the name of Form, Fill and Seal (FFS).

In particular, the containers are generally formed by a heat-forming process, or a drawing of a single sheet of plastic material, such as to obtain an ordered group of containers, all joined together. After forming the group of containers is transferred first to a filler machine, where the container cups are filled with the product, and then on to a sealing machine, where the cups are closed with a film or a suitable lid. Finally, the filled and sealed containers are supplied to a separating machine, where blade cutter devices score and/or cut the flat edges of the container such as to separate them from one another.

Along this production plant, the labelling machine can be located upstream of the filling machine; however, it is generally located downstream of the filler machine, such as to operate with already-full containers of the product to be packed.

Normally, a labelling machine comprises transport means for moving the group of containers through two successive and distinct operating stations, of which a first station in which the heat-shrinkable annular labels are inserted from the bottom onto the body of the containers, and a second heat-shrinking station where the previously-inserted labels are heated such as to cause them to shrink and thus make them adhere perfectly to the containers.

Owing to the presence of these two distinct operating stations, the above-mentioned labelling machine has however a rather limited productivity, and further requires the installation of special mobile support organs which prevent the annular labels from slipping off during the transfer of the containers from the first station to the second heat-shrinking station, thus increasing the level of complication and the costs of construction.

To obviate this drawback, labelling machines have been provided in which the first station is provided with special means for dispensing a hot fluid, typical hot air, which generate jets of the hot fluid which strike the labels immediately after they have been inserted on the relative containers.

In particular, these dispensing means are conformed such that the jets of hot fluid cause localised heat-shrinkage of the labels only at some small portions located immediately below the edge of the relative container, such that these portions adhere to the container itself.

In this way the localised heat-shrinkage effectively prevents the labels from slipping during the transfer thereof towards the following heat-shrinking station, where the true and proper stage of heat-shrinking is done.

One of these machines is described in International application (PCT) no. WO 2005/082601 in the name of Hassia, to which reference is made for further details.

The above-delineated solution, then, obviates the need to provide the labelling machines with means for supporting the labels during transfer, but does not resolve the problems of productivity connected to the presence of two distinct operating stations.

The problems are mostly due to the fact that the two stations need different times in order to complete the relative operations, thus limiting the production rhythm of the whole machine to that of the slower machine, and at the same time requiring the use of complicated and expensive technical solutions for synchronising the two stations to one another.

Also known are labelling machines in which the stages of inserting and heat-shrinking the labels are performed in a single operating station.

The labelling machines are provided with a plurality of label-bearing groups, each of which generally comprises a cylindrical beaker which contains, coaxially to an inside thereof, a respective heat-shrinkable label in the form of an annular band.

The label-bearing groups are associated to means for activating which move the groups cyclically between a loading position, in which they receive a label internally of the relative cylindrical cup, and an unloading position in which they locate the label below a container to be labelled.

Each label-bearing group is further associated to means for raising the relative cylindrical beaker, such as to be able to insert the heat-shrinkable label from the bottom onto the container to be labelled, closing it in the hollow space which is defined between the internal wall of the cylindrical beaker and the external wall of the container to be labelled.

Lastly, each label-bearing group is provided with special dispensing means of a hot fluid, typically hot air, which means dispense the hot fluid internally of the mentioned hollow space between the cylindrical body and the container to be labelled, such as to cause complete heat-shrinkage and thus complete adhesion of the annular label on the body of the container.

One of the labelling machines is described in International patent application (PCT) number WO 2004/085263, in the name of Ghini Enrico, to which reference is made for further details.

These labelling machines are not, however, free of drawbacks.

The positioning of the heat-shrinkable label internally of the cylindrical beaker of the label-bearing groups is for example a difficult and complicated operation, as it is necessary for the label to be perfectly coaxial with the beaker in order not to interfere with the container to be labelled during raising.

Automation of this operation thus requires using constructional solutions which are complicated and sophisticated devices which altogether add significantly to the costs of the labelling machine.

A second drawback derives from the fact that the hot-air fluid dispensing means are directly associated with the label-bearing groups.

This aspect adds to the manufacturing costs of the machine and especially considerably complicates the hydraulic plant supplying the hot fluid, as it has to enable the dispensing means to displace together with the relative groups during transfer of the labels from the loading position to the unloading position.

A third drawback of these machines consists in the fact that the cylindrical beakers of the label-bearing groups can effectively contain a single label format, making the labelling machine poorly flexible and poorly suitable for operating with containers of different sizes.

The aim of the present invention is to obviate the above-mentioned drawbacks in the prior art, with a simple, rational and relatively inexpensive solution.

The aim is attained by a labelling machine and a labelling method, the characteristics of which are respectively recited in the independent claims. The dependent claims delineate preferred and/or particularly advantageous solutions of the invention.

In general a machine is provided for labelling containers, which comprises first transport means for positioning at least a container at a time in a labelling position, second transport means for positioning a heat-shrinkable label in the shape of an annular band below the at least a container in a labelling position, raising means for raising the label in order to insert it from the bottom on the container into a labelling position, and dispensing means of a hot fluid for investing the label with hot fluid, for example hot air or heated steam.

In a first aspect of the invention, the dispensing means are free of the second transport means of the heat-shrinkable labels, such that they are stationary with respect to the labels which advance, moved by the second transport means, and are configured such as to perform heat-shrinking of at least a portion of the heat-shrinkable label inserted on the at least a container which is in the labelling position, which portion extends over the whole axial development of the heat-shrinkable label.

In this way, the labelling machine is effectively able to perform insertion and complete heat-shrinking of the labels in a single operating station, i.e. when the containers are in the above-mentioned labelling position, thus resolving the problems of productivity and synchronisation which are typical of machines having two operating stations.

At the same time the labelling machine is provided with single hot-fluid dispensing means, which operate with all the labels as the labels are positioned below a corresponding container to be labelled, thus contributing to a reduction in costs and constructional complication of the machine.

The hot-air fluid dispensing means are preferably mobile in a vertical direction with respect to the container in the labelling position, between a lowered position and a raised position, and dispense the hot fluid during a vertical displacement between the two extreme positions. In particular, the dispensing means can dispense the hot fluid against the heat-shrinkable label during a displacement from above in a downwards direction and/or during a displacement from below upwards.

In this way the hot fluid dispensed by the dispensing means can effectively strike the label inserted on the container to be labelled over the whole axial development thereof, obtaining complete heat-retraction and perfect adhesion thereof on the container.

The dispensing means are preferably destined to dispense hot fluid jets at a flow-rate and/or velocity which are different according to the axial position of the point of the label which the jets strike. For example, the dispensing means can vary the flow-rate and/or velocity of the hot-fluid jets during the vertical displacement thereof with respect to the container in a labelling position, or can comprise a plurality of outlet nozzles, directed towards a same container in a labelling position and arranged distanced in a vertical direction, which dispense jets of hot fluid having different flow-rates and/or velocities.

In this way, the labelling machine can obtain an effective heat-shrinkage of the labels, even when the containers to be labelled have a generally flared shape, for example truncoconical.

The dispensing means preferably comprise a plurality of diffuser elements which are distinct and reciprocally separate, which are arranged such as to define a ring-fence that surrounds the at least a container in a labelling position, and which are singly provided with at least a nozzle for exit of the hot fluid directed towards the inside of the fence, such as to invest the label inserted on the container in a labelling position with the hot fluid.

Thanks to this solution, each label inserted on a container in a labelling position is struck by the hot-air fluid jets coming from different directions, which can thus strike a whole annular strip of the label, with the result that the heat shrinkage is particularly complete and effective.

The second transport means for positioning the labels below the containers to be labelled preferably comprise a plurality of label-bearing groups which are singly destined to transport a label which is coaxially inserted thereon, and means for drawing for moving the label-bearing groups between a loading position, in which they receive the label, and an unloading position in which they locate the label below a container in a labelling position. The label-raising means are separate from the second transport means, such as to be stationary with respect to the labels which move between the loading position and the unloading position, and comprise at least a vertically-mobile pusher, which pushes the label located in the unloading position from the bottom such as to raise it, freeing it from the label-bearing group and introducing it on the container in the labelling position.

A second aspect of the invention relates to a loading device for inserting the labels on the above-mentioned object-bearing groups in a loading position. The loading device comprises a shaping element having an axial development aligned with the label-bearing group in the loading position, and at least three drawing organs arranged in succession along the axial development of the forming element, which are associated to respective activating motors for drawing and making a tubular body run independently, the tubular body being made of a heat-shrinkable material and being inserted on the forming element towards the label-bearing group in the loading position. In particular, the last of the drawing organs draws the tubular body at a faster velocity than the other drawing organs, such as to separate an annular length of heat-shrinkable material from the end of the tubular body and to make it slide on the forming organ up until it is inserted on the label-bearing group in the loading position.

Differently to the prior art, which generally includes the forming element being associated to two only of the drawing organs, which impress different velocities on the tubular body in order to tear off the end piece thereof, the solution of the present invention enables greater control over the sliding of the heat-shrinkable tubular body over the forming element, effectively preventing pulls and/or tears in undesired points, which might compromise correct functioning of the whole labelling machine.

DISCLOSURE OF INVENTION

The invention makes available a method for labelling containers, which comprises stages of positioning at least a container at a time in a labelling position, positioning a heat-shrinkable label in the shape of an annular band below the container in a labelling position, and raising the label such as to insert it from below on the at least a container in a labelling position. The method of the invention further includes positioning the hot-fluid dispensing means at the labelling position, such that they are stationary with respect to the label which is displaced in order to be position below the container in a labelling position, and performs, with the dispenser means, heat-shrinking of at least a portion of the label when it is inserted on the at least a container which is in the labelling position, where the portion extends over the whole axial development of the label.

In a preferred aspect of the method of the invention, the heat-shrinking of the portion of label is obtained by vertically moving the dispensing means during dispensing of the hot fluid, with respect to the container which is in the labelling position such as to strike the label over the whole axial direction thereof.

The method further includes the possibility of regulating the flow rate and/or the velocity of the hot fluid jets dispensed by the dispensing means, according to the axial position of the points of the label which the hot-air fluid jets strike. For example, the flow-rate and/or the velocity of the hot fluid jets during the vertical displacement of the dispensing means will be varied.

BRIEF DESCRIPTION OF THE DRAWINGS

Further characteristics and advantages of the invention will emerge from a reading of the following description, which is provided by means of a non-limiting example, with the aid of the figures of the appended tables of drawings, in which.

Figure 1:
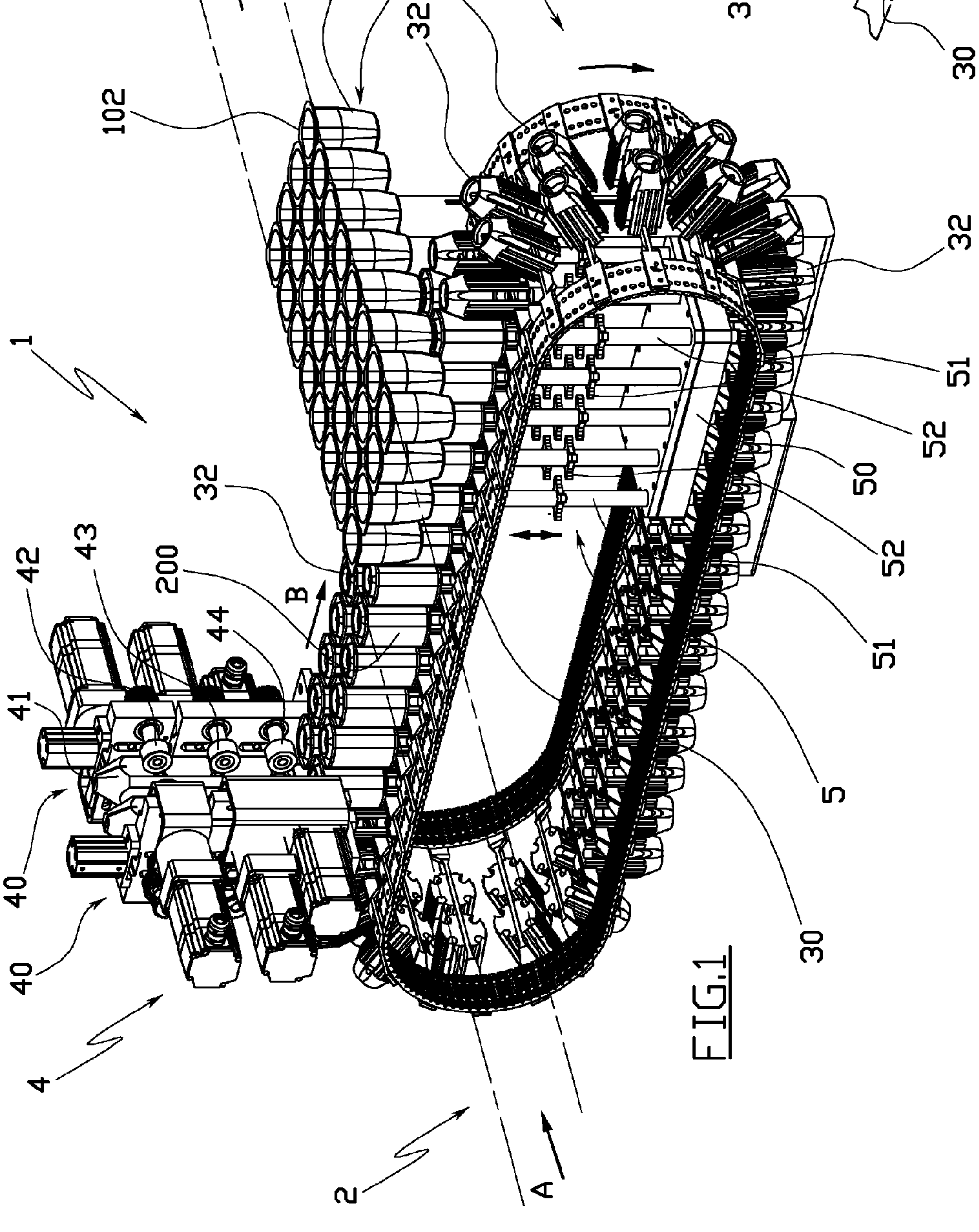
FIG. 1 is a perspective view of the labelling machine of the invention.
Figure 2:
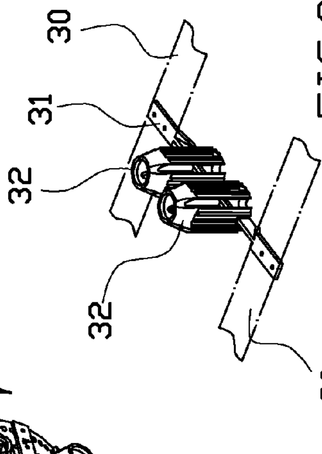
FIG. 2 is a detail of the labelling machine of FIG. 1.
Figure 3:
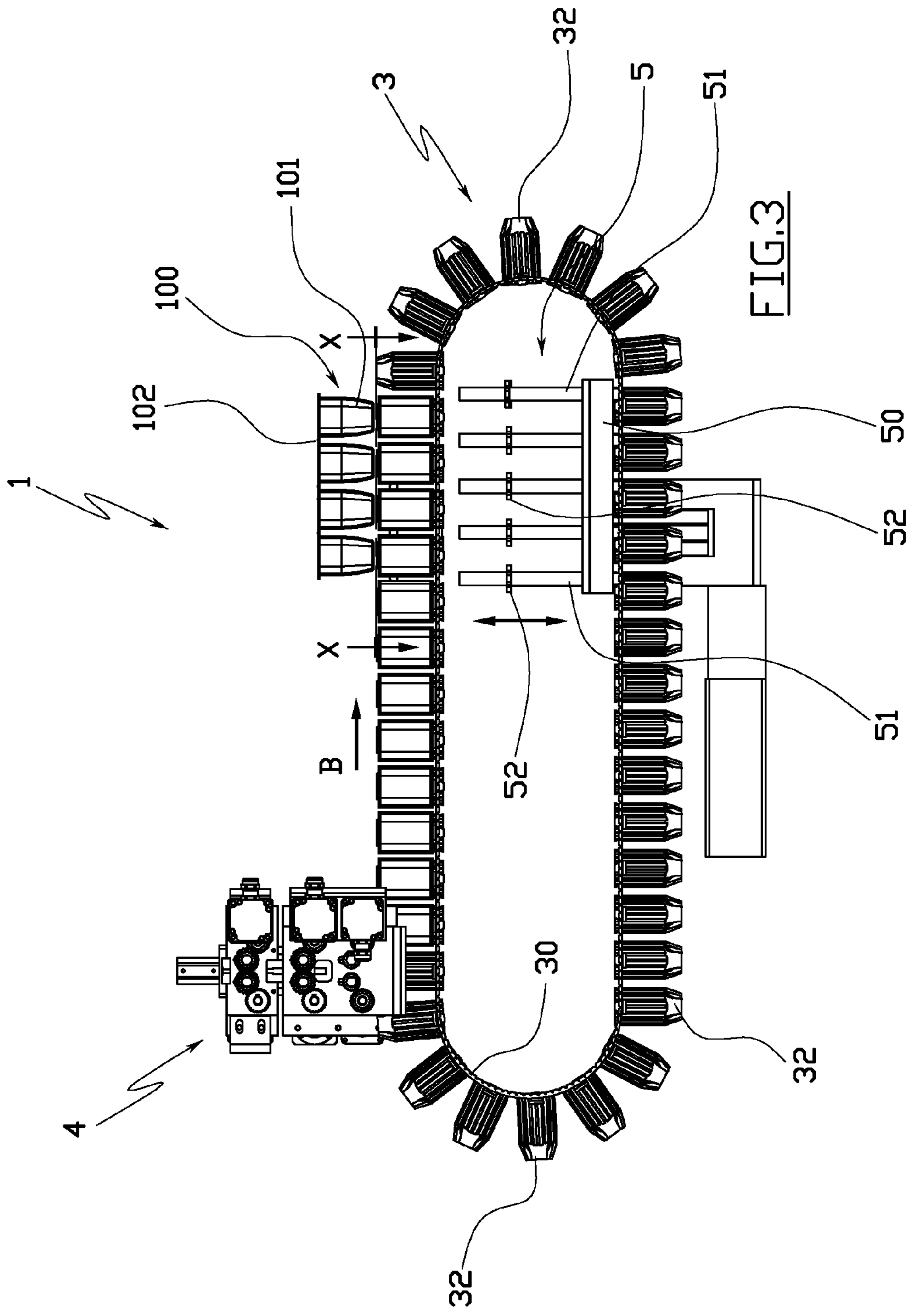
FIG. 3 is a lateral view of the labelling machine of FIG. 1.
Figure 11:
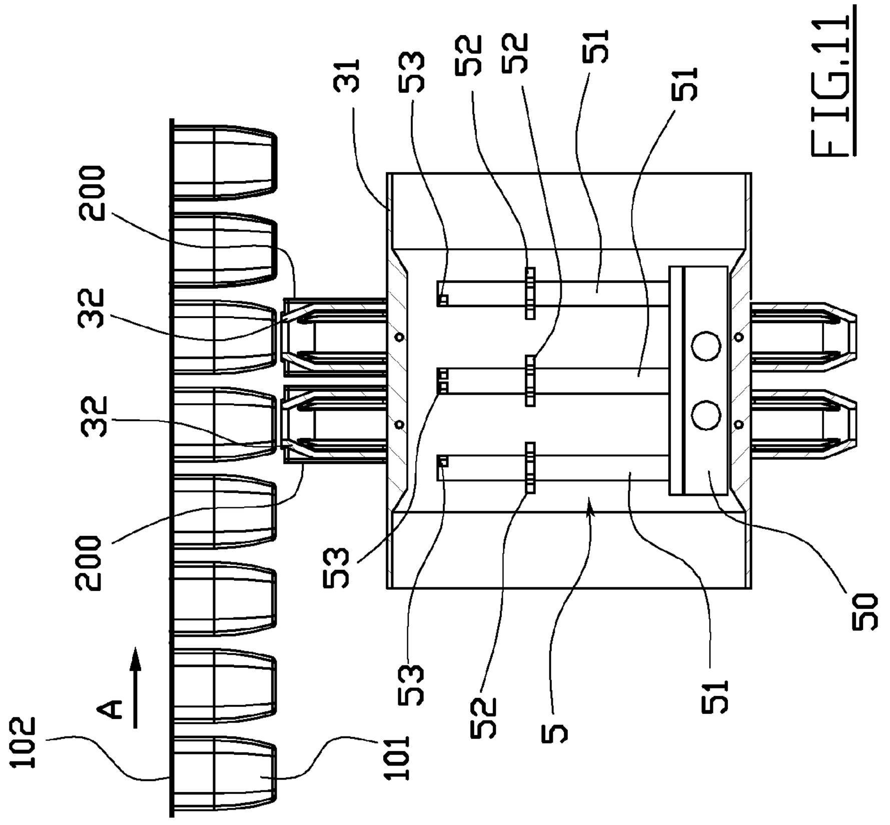
FIG. 11 is second XI-XI of FIG. 10 in a further enlarged scale.
Figure 14:
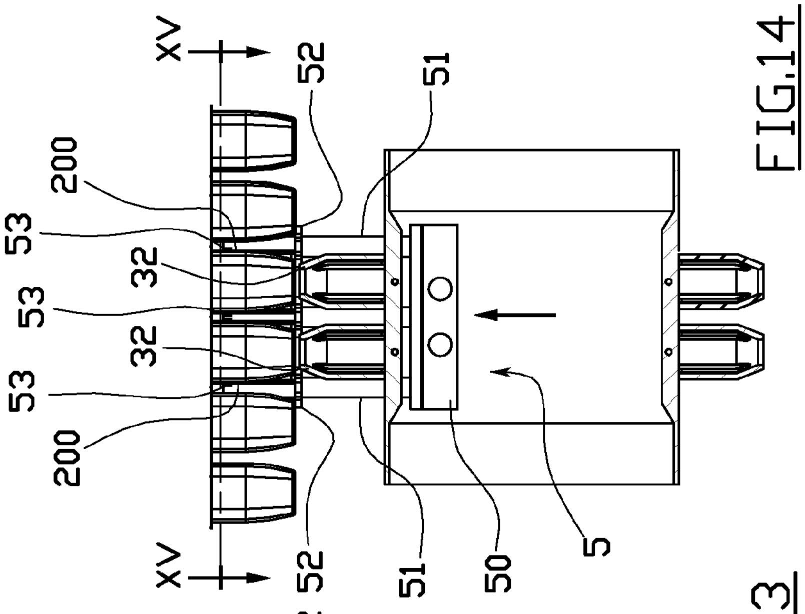
Figure 13:
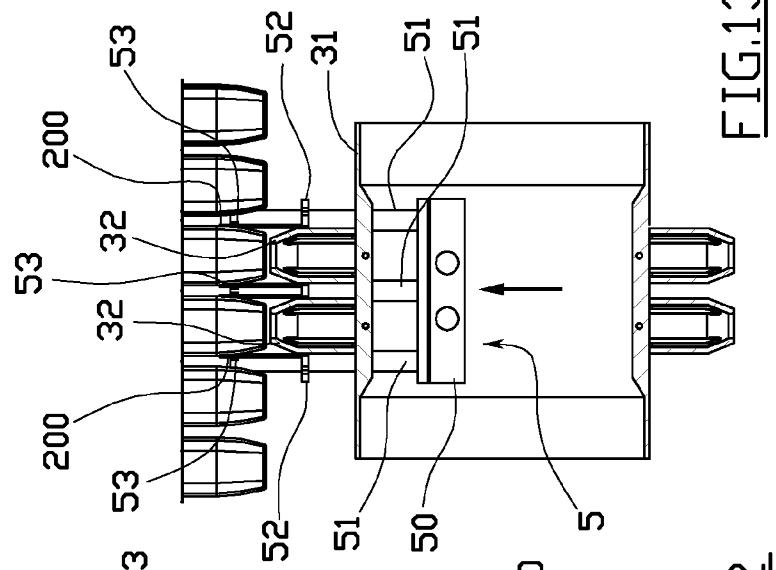
Figure 12:
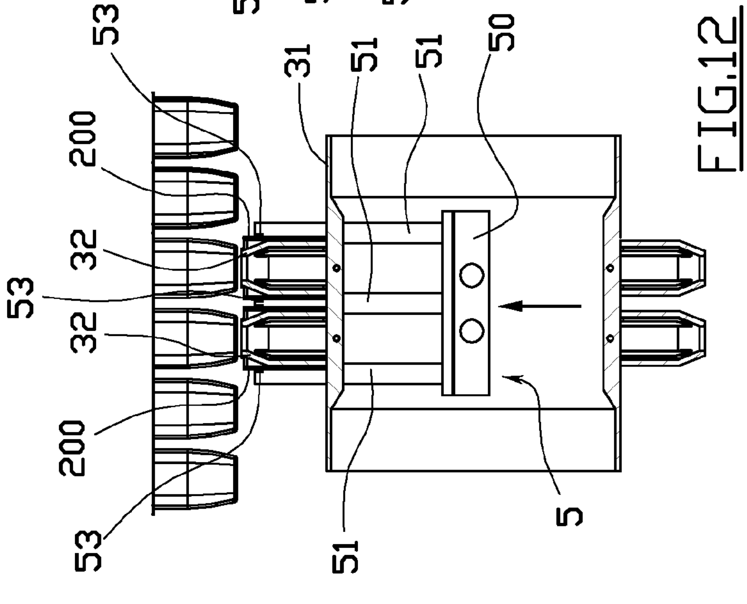
Figure 15:
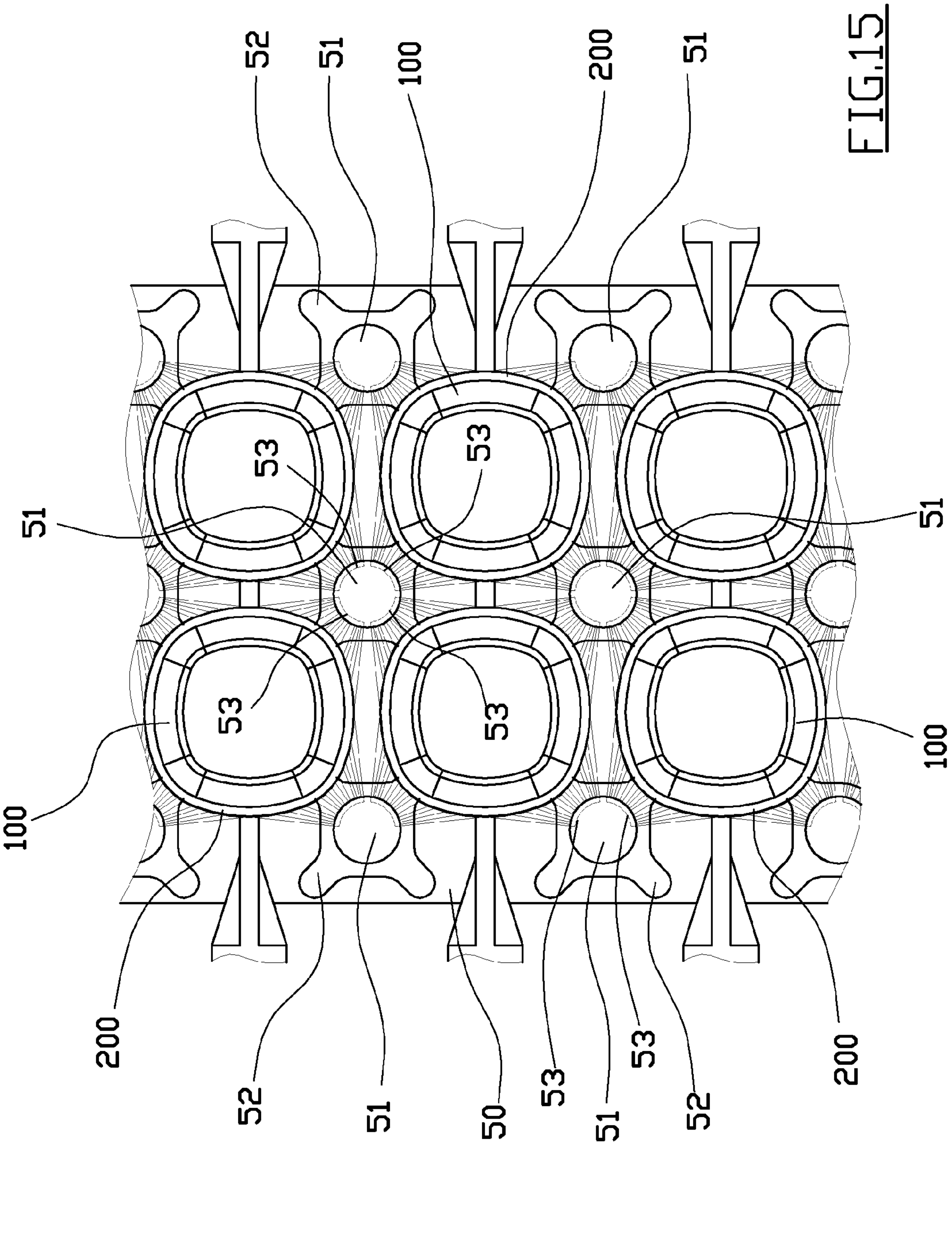
Figure 17:
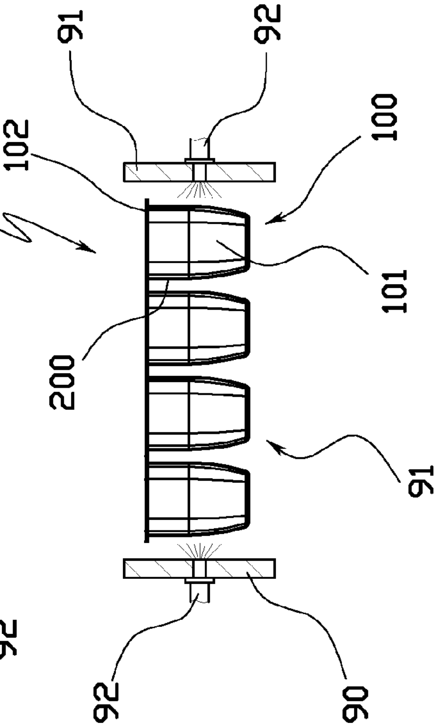
Figure 16:
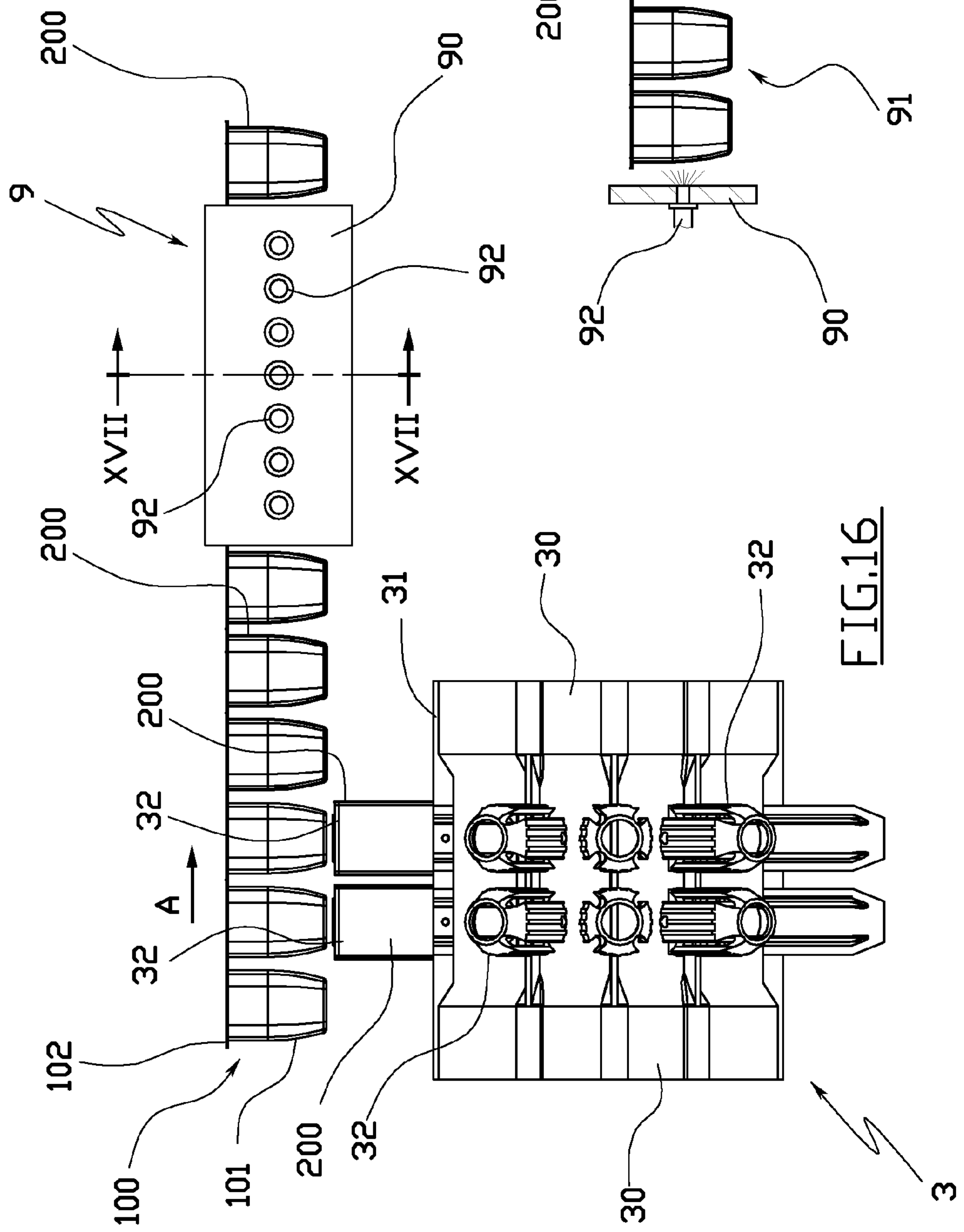

FIGS. from 12 to 14 show FIG. 11 during three operating stages of the labelling machine;

FIG. 15 is the view along section XV-XV of FIG. 14, in enlarged scale and during the heat-shrinking stage;

FIG. 16 is a schematic lateral view of a variant of the labelling machine of FIG. 1;

FIG. 17 is a view along XVII-XVII of FIG. 16.

BEST MODE FOR CARRYING OUT THE INVENTION

FIG. 1 illustrates a machine 1 for labelling plastic containers 100 according to the present invention.

Figure 4:
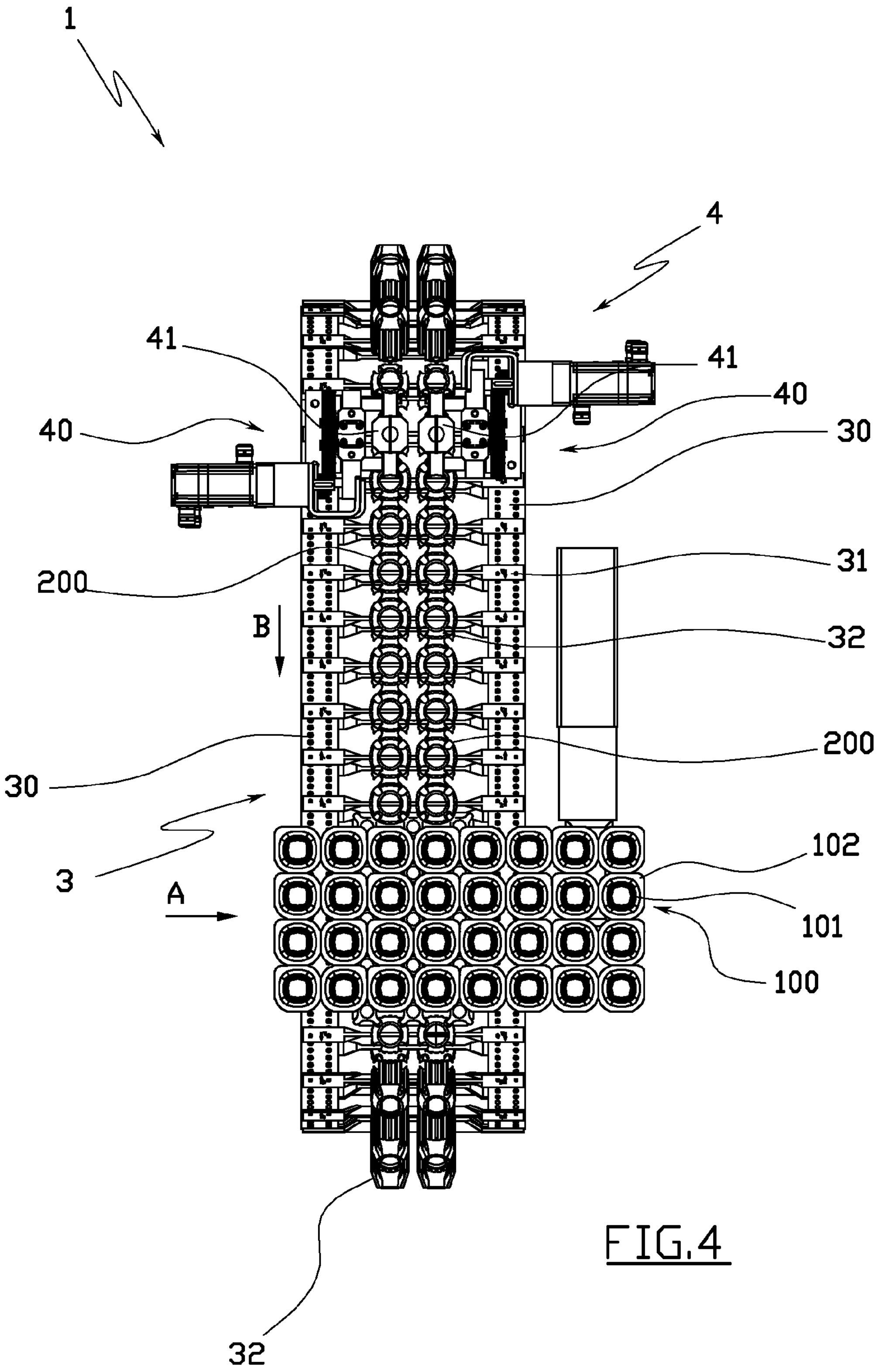
FIG. 4 is a plan view of the labelling machine of FIG. 1.

Each container 100 comprises a beaker-shaped body 101 and a flat upper edge 102, by which it is joined to the adjacent containers 100. The containers 100 are reciprocally aligned along four longitudinal rows, such as to form at the same time an indefinite number of transversal rows (see also FIG. 4). The labelling machine 1 comprises first transport means 2 for moving the containers 100 in an advancement direction A which is parallel to the longitudinal rows of containers 100.

The transport means 2, which are illustrated only schematically, can comprise a plurality of fixed guides, arranged parallel to the advancement direction A and distanced from one another, on which the flat edge 102 of the container 100 rests, such that the beaker-shaped bodies 101 are suspended with the mouths thereof facing upwards. The advancing of the containers 100 on the fixed guides can be done by usual drawing grippers which grip the edges of the containers 100 and draw them on the fixed guides. The labelling machine 1 further comprises second transport means 3, which position a heat-shrinkable label 200 in the form of an annular band below each container 100.

In the present embodiment, the second transport means 3 contemporaneously position a heat-shrinkable label 200 below eight containers 100 which belong to two adjacent transversal rows.

The second transport means 3 comprise a pair of cogged belts 30, parallel and reciprocally distanced, which are ring-wound on relative drawing driven pulleys (not illustrated), such as to slide synchronisedly and at a same velocity in a direction B which is perpendicular to the advancement direction A of the overlying containers 100.

An equidistanced plurality of crossbars 31 is fixed on the cogged belts 30, which crossbars 31 are transversally orientated with respect to the sliding direction B. In the tract comprised between the cogged belts 30, each crossbar 31 bears two distinct label-bearing groups 32. In this way, the transport means 3 overall comprise two rows of the label-bearing groups 32 which run below the containers 100 in the transversal direction B.

Each label-bearing group 32 is a substantially cylindrical body, the lower end of which is fixed to the relative crossbar 31, while the upper end is free and has a tapered shape. Each heat-shrinkable label 200 is inserted from above on a respective label-bearing group 32, such as to be maintained in a perfectly coaxial position thereto, while resting on the underlying crossbar 31.

The body of the label-bearing groups 32 is preferably internally hollow. Along the upper tract of the path defined by the cogged belts 30, the labelling machine 1 comprises two operating devices which are arranged in series in the advancement direction B of the label-bearing groups 32, of which a loading device 4 located upstream to form the annular labels 200 and insert them on the label-bearing groups 32, and an applicator device 5 located downstream for applying the annular labels 200 on the containers 100.

The loading device 4 is located above the advancement plane of the label-bearing groups 32 in upper tract of the cogged belts 30, such as to load the labels 200 coaxially on the groups 32 as they gradually transit below the loading device 4.

Figure 6:
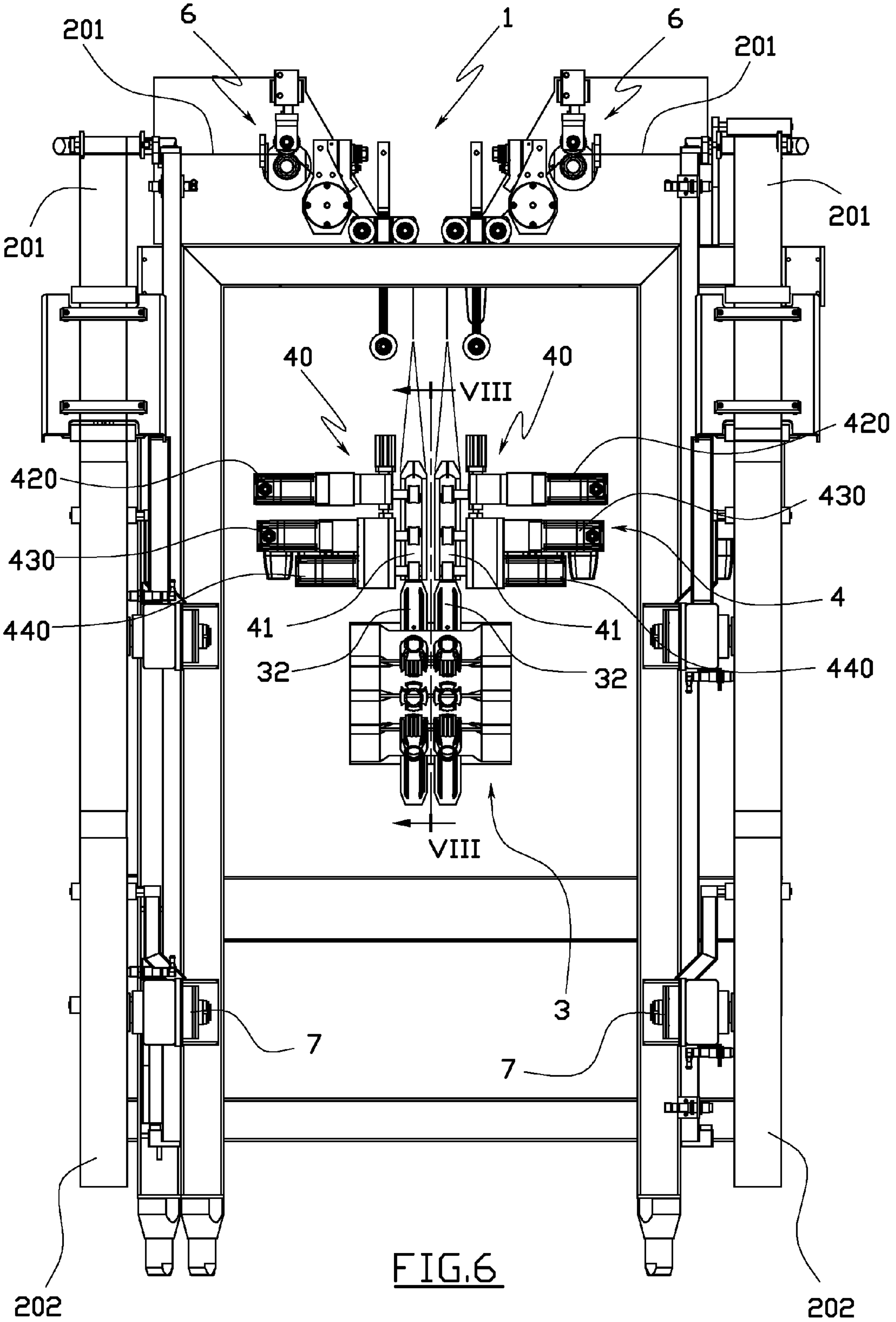
FIG. 6 is the view in the direction of arrow VI of FIG. 5 in enlarged scale.

As shown in FIG. 6, the loading device 4 comprises two identical insertion groups 40, each of which inserts annular labels 200 on a respective row of label-bearing groups 32 borne by the transport means 3.

Each insertion group 40 cooperates with a respective and overlying forming group 6 of the labels 200. In particular, the labels 200 are formed starting from a long tubular body, or sleeve 201 of heat-shrinkable material, which is provided in the form of reels 202 in which the flattened tubular sleeve 201 is wound as a belt.

Figure 5:
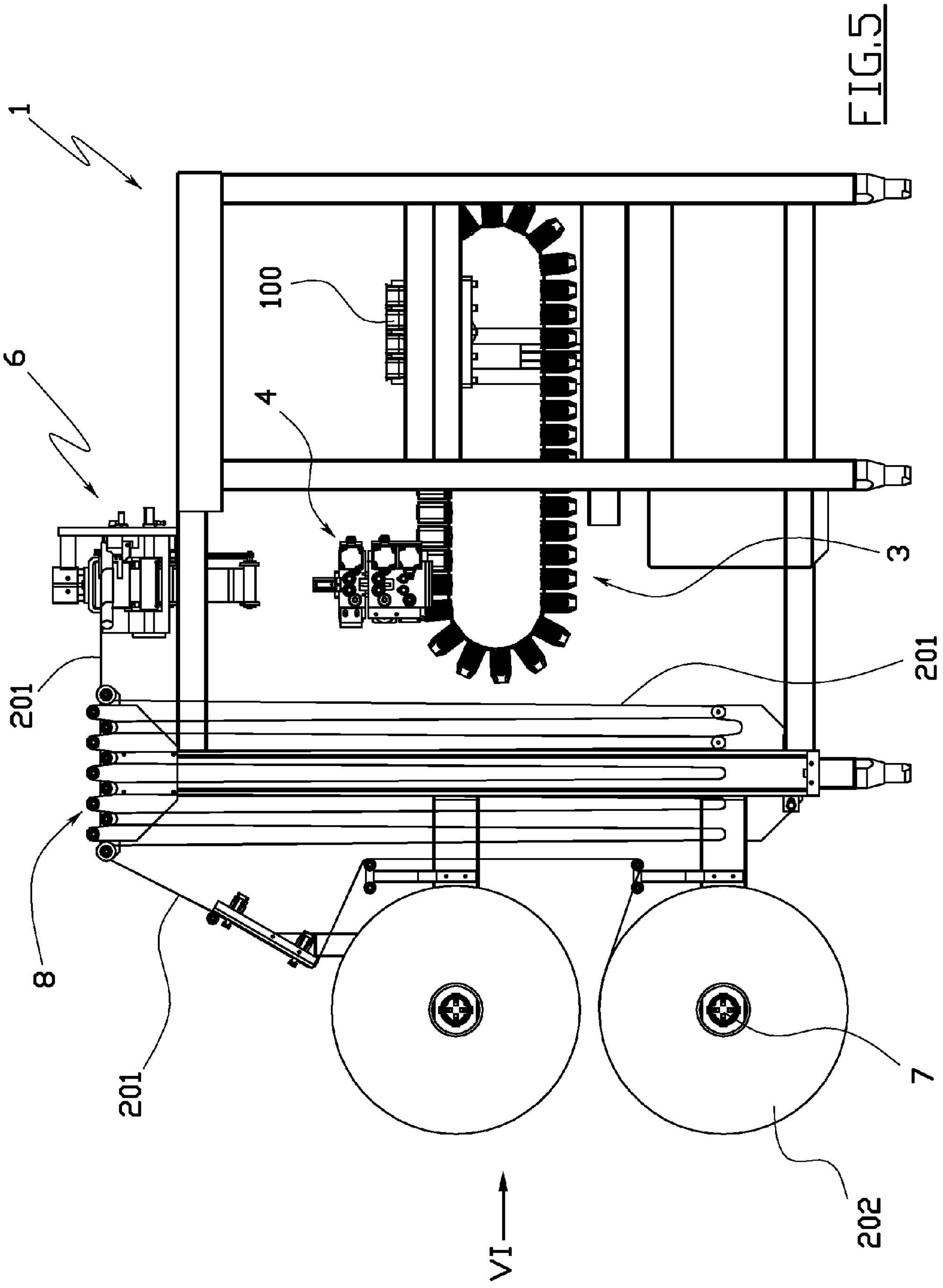
FIG. 5 is a lateral view of the labelling machine of FIG. 1 provided with the means for supplying and forming labels.

Each forming group 6 is thus associated to relative support means 7 of a reel 202 of heat-shrinkable material, on which the reel 202 rotates idle about an axis thereof. As illustrated in FIG. 5, the sleeve 201 which unwinds from the reel 202 is made to pass on a plurality of idle wheels which cause it to run along a long path 8 which is in effect a reserve store of material, meaning that in order to replace the reel 202 it is not necessary to halt production. At the end of the long storage path 8, the sleeve 201 thus passes internally of the forming group 6.

Figure 7:
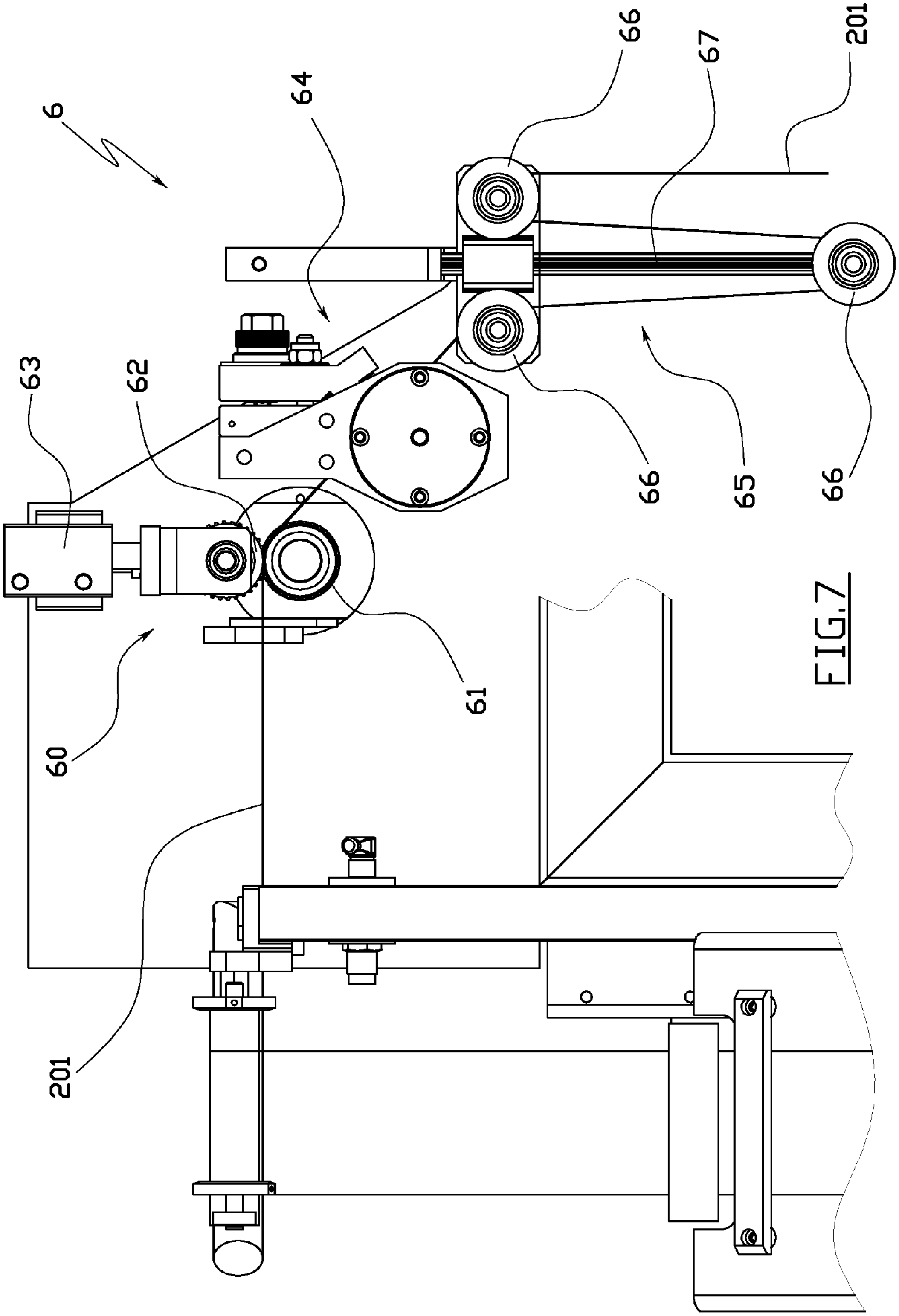
FIG. 7 is a detail in very enlarged scale of FIG. 6.

As illustrated in FIG. 7, the forming group 6 comprises means for drawing 60 the sleeve 201, which comprise a driven roller 61 with which an overlying pressing roller 62 collaborates, which roller 62 presses the sleeve 201 against the driven roller 61 in order to guarantee drawing. The pressing roller 62 is borne by a jack 63, which regulates the distance thereof from the driven roller 61, such as to vary the pressure exerted on the sleeve 201 of heat-shrinkable material.

The forming group 6 further comprises means for pre-scoring 64 the sleeve 201 of heat-shrinkable material which are located downstream of the means for drawing 60 and realise a transversal score at regular intervals during the running of the sleeve 201. The transversal score does not create an effective cut through the sleeve 201, but simply realises a predetermined score-line or weakened line. In this way, the tract of the sleeve 201 downstream of the pre-scoring means 64 is sub-divided by a series of transversal scores into a series of tubular lengths of heat-shrinkable material which are joined together, each of which defines a single label 200.

The means for pre-scoring 64 preferably comprise one or more rotary blades, a velocity of which can be regulated in order to vary a frequency with which the transversal incisions are made, such as to vary the size of the lengths obtainable and thus the labels 200.

Finally the forming group 6 comprises means for stretching 65, which comprise three rotatingly-idle tensioning wheels 66 about which the scored tract of sleeve 201 is wound. The lower tensioning wheel 66 is associated to a jack 67 which enables it to be vertically moved with respect to the other tensioning wheels, such as to regulate and control the tension to which the sleeve 201 of heat-shrinkable material is subjected.

On exiting the means for stretching 65, the scored sleeve 201 is supplied from above towards the respective and underlying insertion group 40.

Figure 9:
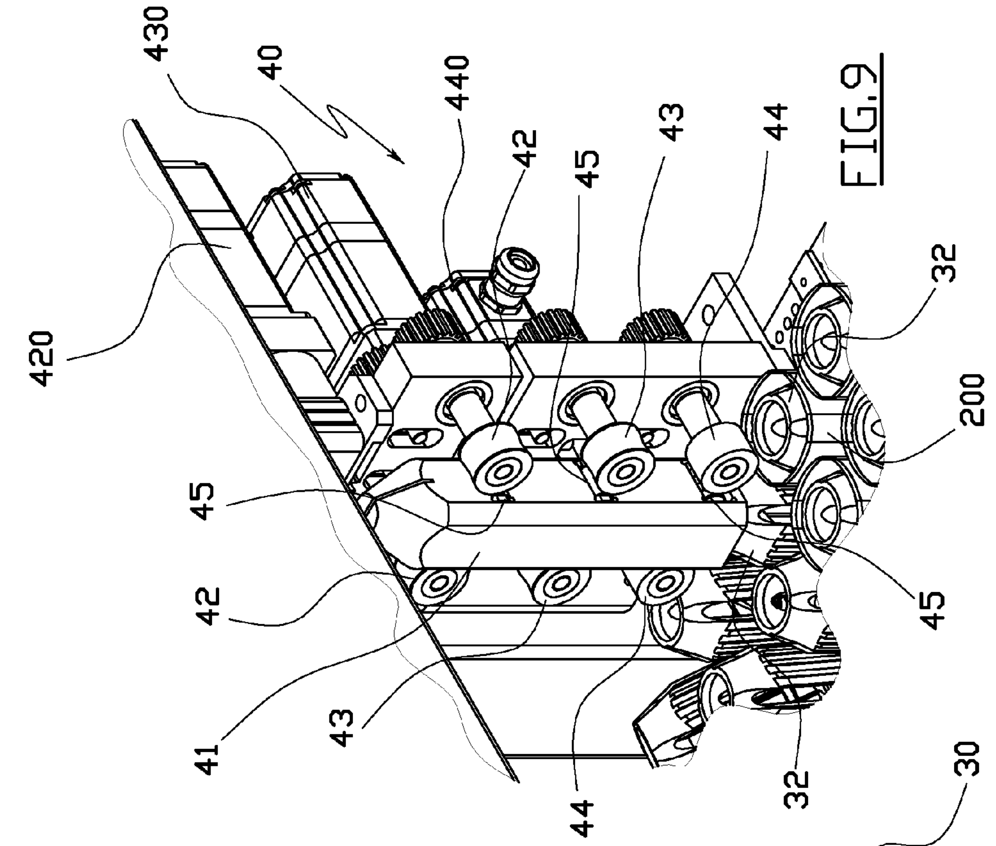
FIG. 9 is a perspective elevation view of the detail of FIG. 8.
Figure 8:
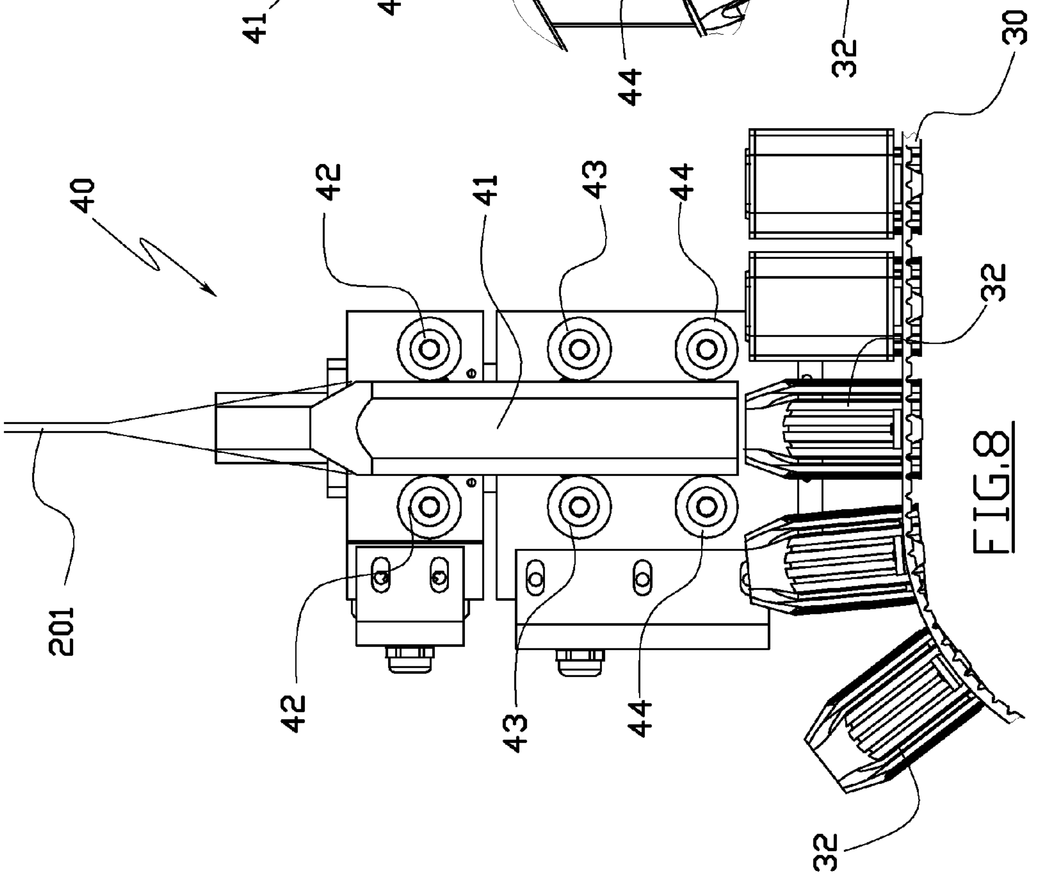
FIG. 8 is second VIII-VIII of FIG. 6, in enlarged scale.

As illustrated in FIGS. 8 and 9, each insertion group 40 comprises a label-forming element 41, which is generally constituted by an elongate body having a prevalently axial development and a constant transversal section, on which the sleeve 201 is inserted, to be widened and to give the labels 200 preformed therein a suitable shape for transferring to the label-bearing groups 32. In the illustrated example, the forming element 41 is substantially prismatic, with slightly concave flanks and rounded corners, and with a tapered upper end for opening out the sleeve 201 without damaging it.

The forming element 41 is vertically oriented and fixed in a position such that during the movement of the cogged belts 30 each label-bearing group 32 of the row can pass into a loading position, in which it is perfectly coaxial below the forming element 41.

Three pairs of horizontal-axis driven rollers, arranged at different levels, are associated to the forming element 41, of which rollers there is a pair of upper rollers 42, a pair of intermediate rollers 43 and a pair of lower rollers 44. The rollers of each pair are reciprocally opposite on opposite sides of the forming element 41, have the same diameter and simultaneously rotate at a same velocity in opposite directions, such as to draw the sleeve 201 to slide along the forming element 41 from above in a downwards direction.

In particular, each pair of rollers 42-44 is activated by a relative electric motor, respectively 420, 430 and 440, which is kinematically connected to both rollers of the pair by means of a cogged-wheel transmission system, so that the rollers of each pair can rotate at a different velocity with respect to the rollers of the other pairs.

In order to perform the drawing action, each driven roller 42-44 rolls on contact with a corresponding horizontally-axis counter-roller 45, which is installed idle in a relative seating afforded in the forming element 41 (see FIG. 9).

In use, the upper rollers 42 and the intermediate rollers 43 are rotated by the relative motors 420, 430 substantially at the same velocity, and have the function of drawing the scored sleeve 201 downwards, which sleeve 201 is coming from the relative forming group 6. The choice of having two groups of drawing rollers with independent drive at different levels along the forming element 41, in the example the pairs of upper rollers 42 and intermediate rollers 43, enables the tension to which the sleeve 201 is subjected to be effectively controlled in order to obtain a uniform descent thereof, preventing pulls and/or tears at undesired points, which might compromise the correct functioning of the whole labelling machine 1.

The lower rollers 44 are rotated at a higher velocity than the other ones, and have the function of tearing the length of heat-shrinkable material located at the end of the sleeve 201, and then of rapidly pushing the label 200 thus obtained to insert it on the underlying label-bearing group 32 in the loading position. The difference in the rotating velocities of the lower rollers 44 and the intermediate rollers 43 subjects the end of the sleeve 201 to a tension such as not to damage the length of heat-shrinkable material, but sufficiently high to cause the breaking of the sleeve 201 along the line of least resistance defined by the transversal score-line, thus separating a label 200 which is thereafter accelerated and inserted on the relative label-bearing group 32.

In particular, it is observed that the moving of the sleeve 201, the separation and descent of the label 200, as well as the advancing of the label-bearing groups 32 are synchronised and regulated such that the transfer of each label 200 from the inserting group 40 to the label-bearing group 32 is done without there being any need to halt the transport means 3, i.e. it is done during a continuous movement of the label-bearing groups 32.

Returning to FIG. 1, the applicator device 5 of the labels 200 on the containers 100 is located downstream of the loading device 4, in a fixed position below the containers 100 to be labelled, in the space comprised between the cogged belts 30. The applicator device 5 comprises a mobile platform 50, which is associated to activating means (not shown) which move it vertically between a lowered position and a raised position. A plurality of vertical columns 51 is installed on the mobile platform 50, which vertical columns 51 are arranged in order and all have the same height, forming a comb structure.

Figure 10:
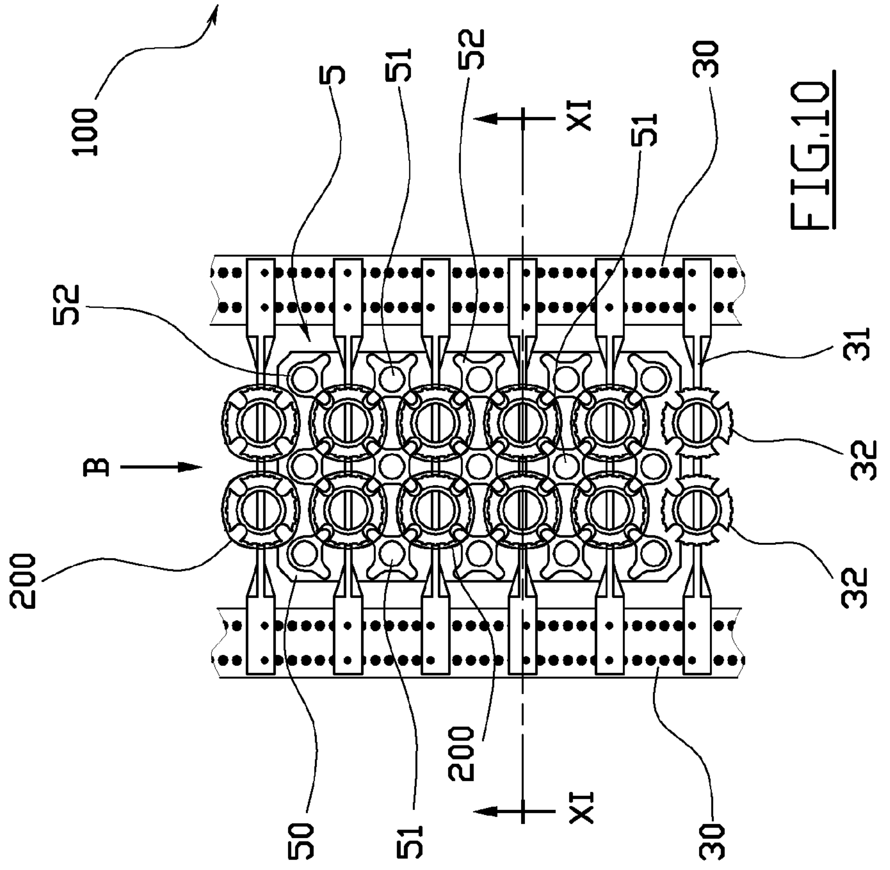
FIG. 10 is the trace section X-X of FIG. 3, shown in enlarged scale.

As illustrated in FIG. 10, the vertical columns 51 are arranged in plan view substantially equidistanced to form three parallel rows in the advancement direction B of the label-bearing groups 32. In particular the rows of vertical columns 51 are staggered with respect to the two rows of label-bearing groups 32 and are positioned such as to be able to insert vertically in the spaces comprised between the annular labels 200 which are aligned to the containers 100 to be labelled, without interfering with the crossbars 31 which bear the label-bearing groups 32.

In more detail the vertical columns 51 are arranged in plan view such that each annular label 200, located below a container 100 to be labelled, is surrounded by a fence formed by four vertical columns 51.

A respective raising plate 52 is fixed to each vertical column 51, the raising plate 52 having a lobed shape in plan view and projecting with respect to the lateral surface of the relative vertical column 51. The raising plates 52 are positioned in an intermediate tract of the vertical columns 51 and are coplanar to one another. During the upwards displacement of the vertical columns 51, the lobes of the raising plates 52 are singly destined to slide internally of corresponding vertical grooves afforded in the label-bearing groups 32. In this way, the lower surfaces of the lobes restingly receive the lower edge of the annular labels 200, raising them and releasing them progressively from the relative label-bearing groups 32, and inserting them on the overlying containers 100 to be labelled (see also FIGS. from 11 to 14).

In particular, the raising plates 52 exhibit a number of lobes such as to be able to interact with all the label-bearing groups 32 adjacent thereto. In this way, for example, some plates 52 of the central row singly raise four labels 200, while other plates 52 of the lateral rows singly raise two labels 200.

The vertical columns 51 are internally hollow such as each to define a respective conveying conduit for a hot fluid, typically hot air or heated steam, which is supplied internally thereof by a single supply plant (not illustrated) which is associated to the mobile platform 50. At the upper end, each vertical column 51 comprises at least an outlet nozzle 53 for the hot fluid conveyed therein (see FIG. 11), which generates a jet of the hot fluid towards the adjacent annular label, when the label is inserted on the relative container 100 to be labelled.

In particular, as illustrated in FIG. 15, each vertical column 51 exhibits a number of outlet nozzles 53 such as to be able to interact with all the containers 100 adjacent thereto. Thus, the vertical columns 51 which are comprised between four containers 100 to be labelled are provided with four outlet nozzles 53 singly directed towards respective annular labels 200; the vertical columns 51 which are comprised between two containers 100 to be labelled are provided with two outlet nozzles 53; while the vertical columns 51 adjacent to a single container 100 to be labelled (not visible in FIG. 15), i.e. the one located in plan view at the corners of the mobile platform 50, are provided with a single outlet nozzle 53.

The outlet nozzles 523 are all located substantially at a same height such that when the vertical columns 51 are in a raised position, the jets of hot fluid generated thereby spray the zone of the annular labels 200 located immediately below the flat edge 102 of the containers 100 to be labelled (see FIG. 14).

Further, the outlet nozzles 53 are configured such that the whole of the outlet nozzles 53 surrounding a single container 100 to be labelled are destined to strike a whole annular strip of the relative label 200, such as to cause total heat-shrinking of the annular strip about the relative container 100 (see FIG. 15).

In use the transport means 2 advance the containers 100 to be labelled by steps, halting them cyclically such as each time to position two transversal rows of containers 100 to be labelled in a predetermined labelling position above the transport means 3 of the heat-shrinkable labels 200. In turn the transport means 3 of the heat-shrinkable labels 200 advance the label-bearing groups 32 by steps, halting them cyclically such as each time to position a label-bearing group 32, provided with the relative labels 200, each in an unloading position in which it is coaxially below a container 100 in a labelling position.

In this configuration, the label-bearing group 32 is arranged staggered with respect to the underlying vertical columns 51 of the application device 5, which are therefore free to run vertically between the crossbars 31 of the space between the label-bearing groups 32, as illustrated in FIG. 10.

Initially the mobile platform 50 is in the lowered position, so that the vertical columns 51 are below the advancement plane of the labels 200 and do not interfere with the displacement of the transport means 3 (see FIG. 11). After having obtained an alignment between the annular labels 200 and the overlying containers 100 to be labelled, the mobile platform 50 is progressively raised.

As illustrated in FIGS. from 12 to 14, firstly the raising plates 52 reach contact with the lower edge of the labels 200 which have been inserted on the label-bearing groups 32 resting on the crossbars 31; then the lobes of the raising plates 52 run in the vertical grooves of the label-bearing groups 32, progressively raising the labels 200 up to completely inserting them on the overlying containers to be labelled.

As illustrated in FIG. 15, once the position of maximum raising has been reached, the vertical columns 51 are inserted in the empty spaces comprised between the containers 100 in the labelling position, so that each of them is surrounded by a fence formed by four vertical columns 51.

At this point, the hot-fluid supply plant enters into operation, such that the outlet nozzles 53 of the vertical columns 51 produce jets of hot fluid which spray the upper annular portion of the labels 200 which are inserted on the containers 100 in a labelling position.

The effect of the hot fluid jets is to cause heat-shrinking of the upper annular portion of the label 200, causing them to adhere and fixing them to the relative containers 100 in the labelling position.

Thereafter, during the dispensing of the hot fluid, the mobile platform 50 is progressively lowered towards the initial position, such that the vertical downwards movement of the outlet nozzles 53 enables the whole vertical development of the labels 200 to be progressively sprayed with the jets of hot fluid.

In this way, an effective total heat-shrinkage of the annular labels 200 is obtained, which, at the end of the descent of the vertical columns 51, is perfectly adherent and fixed to the containers 100 in a labelling position, without there being any need to subject them to further stages of heating and heat-shrinking.

In particular, the means for supplying hot fluid are preferably configured to be able to vary the flow rate and/or the velocity of the hot-fluid jets, during the vertical displacement of the outlet nozzles 53.

If the containers 100 have a flared axial development, for example truncoconical, the radial play between the lateral wall of the container 100 and the label 200 inserted on it is not constant but is variable in a vertical direction. In order to obtain a uniform adhesion, it is therefore necessary that in the zones in which the play is greater, the percentage of heat-shrinking of the label 200 is greater than the zones in which the play is less. By varying the flow-rate and/or the velocity of the hot fluid jets during the vertical displacement, i.e. according to the axial position of the points of the label 200 which the jets strike, it is possible to locally modify the percentage of heat-retraction, such as to obtain a uniform adhesion of the label 200 on the relative container 100.

Alternatively, the same result could be attained by providing each vertical column 51 with a plurality of outlet nozzles 53, directed towards a same container 100 in a labelling position and arranged aligned in a vertical direction, i.e. according to the vertical development of the container 100 in a labelling position, and configuring the means for supplying the hot fluid, such that the outlet nozzles 53 dispense jets of hot fluid having different flow rates and/or velocities, according to the axial position of the points of the label 200 which they strike. In this way, the hot-air dispensing can effectively be done while the vertical columns remain stationary in a fixed dispensing position, in which they face the lateral wall of the relative containers 100 in labelling positions.

Thanks to the characteristics of the labelling machine 1 as above-described, the aims of the invention are attained. By keeping the containers 100 stationary in a single labelling position, the labelling machine 1 is effectively able to realise, with a single operating stage, both the insertion of the heat-shrinkable annular labels 200 on the containers 100 to be labelled, and the heat-shrinkage of the labels on the containers 100, without there being any need to provide further heat-shrinking stations downstream of the labelling machine 1 along the advancement direction A of the containers 100, as happens in the prior art.

This solution thus enables considerable simplification of the labelling plant, consequently also reducing the installation and maintenance costs, as well as reducing the time required for performing the labelling operation, and therefore increasing the productivity of the plant.

As illustrated in FIGS. 16 and 17, the invention includes the possibility of installing, along the advancement direction A of the containers 1 and downstream of the labelling positions, a finishing station 9 in which the containers 100 in transit are invested with a further flow of hot air, typically air or heated steam, such as to ensure adhesion of the relatively heat-shrinkable labels 200.

The finishing station 9 preferably comprises a pair of fixed lateral walls 90 which develop parallel to the advancement direction A of the containers 100, and which are located on opposite sides with respect to the rows of containers 100, such as to define a fixed longitudinal corridor 91 which is progressively followed by all the already-labelled containers 100 advanced by the transport means 2.

The lateral walls 90 are located substantially at the same height as the containers 100 and have a greater vertical development than the body 101 of the containers 100. The longitudinal corridor 91 defined by the lateral walls 90 can be inferiorly and/or superiorly closed, such as substantially to realise a tunnel which remains open only in the advancement direction A of the containers 100.

The finishing station 9 further comprises means 92 for constantly injecting, or injecting at specially-calculated intervals, a flow of hot fluid internally of the longitudinal corridor 91 defined by the lateral walls 90, such as to spray the labels 200 fixed to the containers 100 which progressively transit there-through.

In this way, the finishing station 9 enables improvement and guaranteeing of the adhesion of the labels 200 to the relative containers 100, without limiting the productivity of the labelling machine 1, as the longitudinal corridor 91 is fixed and is crossed freely by the containers.

Obviously a technical expert in the sector might make numerous modifications of a technical-applicational nature to the labelling machine 1 as described above, without forsaking the ambit of the invention as claimed below.

The invention claimed is:

1. A method for containers, comprising the steps of: positioning at least one container (100) at a time in a labeling position, positioning at least one heat-shrinkable label (200) in a form of an annular band below each container located in a labeling position, and raising the label (200) such as to insert the label (200) from below on the at least one container (100) in a labeling position, positioning dispensing device (51, 53), said dispensing device comprising a plurality of columns and at least one nozzle associated with each of said plurality of columns, for dispensing a hot fluid at the labeling position, such that once a position of maximum raising has been reached, the columns are inserted in empty spaces comprised between the containers in the labeling position and the dispensing device is stationary with respect to the label (200) which is displaced in order to be positioned below the container (100) in a labeling position, and performing, by means of the dispensing device (51, 53), heat shrinkage of at least a portion of the label (200) when the label is inserted on the at least one container (100) which is in the labeling position, in which the portion extends over a whole axial development of the label (200), wherein the heat shrinkage of the portion of the label (200) on the container (100) in the labeling position is obtained by vertically moving the dispenser means (51, 53) during dispensing of the hot fluid, such as to invest the label (200) over the whole axial development thereof.

2. The method of claim 1, wherein the dispensing of the hot fluid occurs during a displacement of the dispensing means (51, 53) from above in a downwards direction.

3. The method of claim 2, wherein the dispensing of the hot fluid is done during a displacement of the dispensing means (51, 53) from below in an upwards direction.

4. The method of claim 1, further comprising varying a flow-rate and/or a velocity of jets of the hot fluid dispensed by the dispensing means (51, 53), according to the axial position of the points of the labeling (200) which the jets of hot fluid strike.

5. The method of claim 2, further comprising varying the flow rate and/or the velocity of the jets of hot fluid dispensed by the dispensing means (51, 53) during vertical displacement of the dispensing means (51, 53).

6. The method of claim 1, further comprising striking the labels (200) with a hot fluid, which labels are fixed to containers (100) downstream of the labeling position.

7. A machine for labeling containers (100), comprising: first transport device (2) for positioning at least one container (100) at a time in a labeling position, second transport device (3) for positioning an annular heat-shrinkable label (200) below the at least one container (100) in a labeling position, raising device (50, 52) for raising the label (200) for inserting the label from below onto a container (100) in a labeling position, and dispensing device (51, 53) for investing the label (200) with a hot fluid, the dispensing device (51, 53) being vertically mobile with respect to the at least a container (100) in the labeling position, said dispensing device comprising a plurality of columns and at least one nozzle associated with each of said plurality of columns, said plurality of columns being configured such that once a position of maximum raising has been reached, the columns are inserted in empty spaces comprised between the containers in the labeling position, and unconstrained to the second transport device (3) such as to be stationary with respect to the labels (200) which advance, activated by the second transport device (3), and are configured such as to perform heat-shrinkage of at least a portion of the label (200) inserted on the at least a container (100) in a labeling position thereon, in which the portion extends over an entire axial development of the label (200), and wherein the dispensing means (51, 53) is configured to dispense hot fluid during a vertical displacement thereof.

8. The machine of claim 7, wherein the dispensing means (51, 53) dispense a hot fluid during a displacement of the dispensing means (51) 25 in a downwards direction.

9. The machine of claim 8, wherein the dispensing means (51, 53) dispense a hot fluid during a displacement of the dispensing means (51) in an upwards direction.

10. The machine of claim 7, wherein the dispensing means (51, 53) are associated to raising means (50, 52) of the labels (200), such as to move solidly together therewith in a vertical direction.

11. The machine of claim 7, wherein the dispensing means (51, 53) dispense jets of hot fluid having a different flow rate and/or velocity according to an axial position of points of the label (200) which the jets strike.

12. The machine of claim 7, wherein the dispensing means (51, 53) comprise a plurality of outlet nozzles (53) arranged distanced in a vertical direction, which dispense jets of hot fluid having different flow rates and/or velocities.

13. The machine of claim 12, wherein the dispensing means (51, 53) vary the flow rate and/or velocity of the hot-fluid jets during vertical displacement thereof with respect to the container (100) in the labeling position.

14. The machine of claim 7, wherein the dispensing means comprise a plurality of diffuser elements which are distinct and reciprocally separate, which are arranged such as to define a fence surrounding the at least a container (100) in a labeling position, the diffuser elements being singly provided with at least an outlet nozzle (53) directed towards an inside of the fence defined thereby, such as to invest the label (200) inserted on the container (100) in the labeling position with a jet of hot fluid.

15. The machine of claim 14, wherein the outlet nozzle (53) belonging to the diffuser elements which define the ring-fence are configured such that the jets of hot fluid dispensed thereby are overall destined to strike at least a complete annular band of the heat-shrinkable label (200).

16. The machine of claim 7, wherein the raising means (50, 52) are unconstrained to the second transport means (3) such that the raising means (50, 52) are stationary with respect to the labels (200) which advance, activated by the second transport means (3), and comprise at least a vertically-mobile pusher (52), which pushes the label (200) positioned below the at least a container (100) upwards into a labeling position.

17. The machine of claim 7, wherein the first transport means (2) simultaneously position a plurality of containers (100) in respective labeling positions, in that the second transport means (3) position a corresponding plurality of heat-shrinkable labels (200) each below a corresponding container (100) into a labeling position, in that the raising means simultaneously raise the labels (200) such as to insert the labels (200) from below onto corresponding containers (100) in a labeling position, and in that the dispensing means (51, 53) are configured such as simultaneously to perform complete heat-shrinking of the labels (200) inserted on the container (100) in a labeling position.

18. The machine of claim 17, wherein the dispensing means comprise a plurality of diffuser elements, distinct and reciprocally separate, which insert in spaces comprised between the containers (100) in the labeling position, such as to define a fence about each of the containers (100) in the labeling position, each diffuser element being provided with at least an outlet nozzle (53) of the hot fluid directed towards an inside of a fence of the fences, such as to strike the label (200) contained therein.

19. The machine of claim 18, wherein at least one of the diffuser elements comprises a plurality of outlet nozzles (53) for directing a jet of hot fluid internally of an equal plurality of the fences, such as simultaneously to strike the plurality of labels (200) contained therein.

20. The machine of claim 18, wherein the raising means (50, 52) are unconstrained to the second transport means (3), such as to be stationary with respect to the labels (200) which advance due to the action of the second transport means (3), and comprise a plurality of vertically-mobile pushers (52), which simultaneously push the labels (200) positioned below the containers (100) upwards into the labeling position.

21. The machine of claim 20, wherein at least one of the pushers (52) acts simultaneously with a plurality of labels (200), each of which is positioned below a relative container (100) in the labeling position.

22. The machine of claim 7, wherein the second transport means (3) comprise a plurality of label-bearing groups (32) singly destined to transport a label (200) inserted thereon, and means for activating (30) for cyclically moving each label-bearing group (32) between a loading position in which it receives a label (200), and an unloading position in which it is located below a container (100) in the labeling position.

23. The machine of claim 22, further comprising at least a loading device (4) for inserting a label (200) on a label-bearing group (32) which is in the loading position.

24. The machine of claim 7, further comprising a finishing station (9), located downstream of the labeling position along the path of the containers (100) defined by the first transport means (2), which finishing station (9) comprises operating means (91, 92) for striking the labels (200) fixed to the transiting containers (100) with a hot fluid.

25. The machine of claim 24, wherein the operating means comprise a fixed corridor (91), open in the advancement direction (A) of the containers (100) in order to be crossed by the containers (100) themselves, and means (92) for injecting hot fluid internally of the corridor (91).

* * * * *